(12) United States Patent
Lucas et al.

(10) Patent No.: US 10,516,178 B2
(45) Date of Patent: Dec. 24, 2019

(54) FUEL CELL SYSTEM AND METHOD FOR RECIRCULATING WATER IN A FUEL CELL SYSTEM

(71) Applicant: Volkswagen AG, Wolfsburg (DE)

(72) Inventors: Christian Lucas, Braunschweig (DE); Rune Staeck, Gifthorn (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 163 days.

(21) Appl. No.: 15/353,385

(22) Filed: Nov. 16, 2016

(65) Prior Publication Data
US 2017/0141417 A1 May 18, 2017

(30) Foreign Application Priority Data
Nov. 17, 2015 (DE) .......................... 10 2015 222 635

(51) Int. Cl.
| | |
|---|---|
| *H01M 8/04* | (2016.01) |
| *H01M 8/04291* | (2016.01) |
| *H01M 8/04119* | (2016.01) |
| *H01M 8/1018* | (2016.01) |

(52) U.S. Cl.
CPC ... *H01M 8/04291* (2013.01); *H01M 8/04141* (2013.01); *H01M 8/04156* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 4,344,479 | A | * | 8/1982 | Bailey ........................ F22B 7/00 165/109.1 |
| 5,458,467 | A | * | 10/1995 | Yuhasz ...................... F04D 9/06 417/80 |
| 5,785,846 | A | * | 7/1998 | Barnes .................. E04H 4/1272 210/167.12 |
| 7,037,610 | B2 | | 5/2006 | Meissner et al. |
| 7,172,827 | B2 | | 2/2007 | Scholta et al. |

(Continued)

FOREIGN PATENT DOCUMENTS

| | | |
|---|---|---|
| DE | 10104246 | 6/2002 |
| DE | 10343264 | 4/2004 |
| EP | 1724867 | 11/2006 |

*Primary Examiner* — Scott J. Chmielecki
(74) *Attorney, Agent, or Firm* — Davidson, Davidson & Kappel, LLC

(57) ABSTRACT

A fuel cell system (1) in which a water separator (110) for separating liquid water from an exhaust gas (6, 4) of a fuel cell (10) of the fuel cell system (1) is fluid-mechanically coupled into an exhaust gas path (32, 22) of the fuel cell system. A water recirculator (120) is fluid-mechanically coupled into the fuel cell system (1), with the aid of which at least a portion of the water of the water separator (110) is once again providable to the fuel cell (10). Moreover, a method for recirculating water in a fuel cell system (1), in which liquid water of a fuel cell supply (30, 20) of the fuel cell system (1) is withdrawn at a removal site at/in the fuel cell supply (30, 20). The water upstream from the removal site is provided to the same fuel cell supply (30, 20) and/or to some other fuel cell supply (20, 30) of the fuel cell system (1).

19 Claims, 2 Drawing Sheets

(56) References Cited

U.S. PATENT DOCUMENTS

| | | | | |
|---|---|---|---|---|
| 2007/0015035 A1* | 1/2007 | Izenson | ............... | H01M 8/0206 |
| | | | | 429/444 |
| 2009/0001229 A1* | 1/2009 | Jensen | ................... | F16L 55/18 |
| | | | | 248/74.1 |
| 2010/0216039 A1* | 8/2010 | Jahnke | ...................... | F22B 1/18 |
| | | | | 429/413 |
| 2014/0227618 A1* | 8/2014 | Handgraetinger | ........................... | |
| | | | | H01M 8/04029 |
| | | | | 429/414 |
| 2015/0004504 A1* | 1/2015 | Bardeleben | .......... | B01D 53/265 |
| | | | | 429/413 |
| 2016/0181647 A1* | 6/2016 | Lambrech | ........... | H01M 8/2465 |
| | | | | 429/415 |
| 2018/0062186 A1* | 3/2018 | Jahnke | ............... | H01M 8/04029 |
| 2018/0241060 A1* | 8/2018 | Harbusch | .......... | H01M 8/04843 |

* cited by examiner

FUEL CELL SYSTEM AND METHOD FOR RECIRCULATING WATER IN A FUEL CELL SYSTEM

This claims the benefit of German Patent Application DE 10 2015 222 635.2, filed Nov. 17, 2015 and hereby incorporated by reference herein.

The present invention relates to a fuel cell system and a method for recirculating water in a fuel cell system. Moreover, the present invention relates to a fuel cell system for a vehicle, in particular an electric vehicle.

BACKGROUND

A fuel cell of a fuel cell system utilizes an electrochemical reaction of a hydrogen-containing fuel with oxygen to form water for generating electrical energy. For this purpose, the fuel cell contains at least one so-called membrane electrode assembly (MEA) as a core component, which is a structure made up of an ion-conducting or proton-conducting membrane and electrodes situated on both sides of the membrane: an anode electrode and a cathode electrode. In addition, gas diffusion layers (GDL) may be situated on both sides of the membrane electrode assembly on the sides of the electrodes facing away from the membrane.

The fuel cell is generally formed by a plurality of membrane electrode assemblies arranged in a stack, the electrical power of the membrane electrode assemblies during operation of the fuel cell being additive. Bipolar plates, also referred to as flow field plates or separator plates, are usually situated between the individual membrane electrode assemblies, and ensure that the membrane electrode assemblies, i.e., the single cells of the fuel cell, are supplied with the operating media, the so-called reactants, and are also generally used for cooling. Furthermore, the bipolar plates provide for an electrical connection in each case to the particular adjoining membrane electrode assemblies.

During operation of the single cells of the fuel cell (single cell: membrane electrode assembly and an associated anode chamber delimited by a bipolar plate, and an associated cathode chamber delimited by a second bipolar plate), the fuel, a so-called anode operating medium, is fed to the anode electrodes via an open flow field of the bipolar plates on the anode side, where an electrochemical oxidation of $H_2$ to $H^+$ takes place with emission of electrons ($e^-$) ($H_2 \rightarrow 2H^+ + 2e^-$). Water-bound or water-free transport of the protons ($H^+$) that are formed, from the anode electrodes ((combined) anode of the fuel cell) in the anode chambers of the single cells to the cathode electrodes ((combined) cathode of the fuel cell) in the cathode chambers of the single cells takes place through the membranes or electrolytes of the membrane electrode assemblies, which electrically insulate and separate the reaction chambers in question (anode chamber-cathode chamber pairs) from one another in a gas-tight manner.

The electrons provided at the anode are conducted via an electrical line and an electrical consumer (electric traction motor, air conditioner, etc.) to the cathode. The cathode electrodes of the cathode are supplied with an oxygen-containing cathode operating medium via an open flow field of the bipolar plates on the cathode side, and a reduction of $O_2$ to $O^{2-}$ takes place with acceptance of electrons ($\frac{1}{2}O_2 + 2e^- \rightarrow O^{2-}$). At the same time, the oxygen anions ($O^{2-}$) formed at the cathode electrodes react with the protons transported through the membranes or electrolytes to form water ($O^{2-} + 2H^+ \rightarrow H_2O$).

To supply a fuel cell stack, referred to below primarily as a fuel cell, with operating media, the fuel cell stack/fuel cell includes an anode supply on the one hand and a cathode supply on the other hand. The anode supply includes an anode supply path for feeding the anode operating medium into the anode chambers of the fuel cell, and an anode exhaust gas path for discharging an anode exhaust gas out of the anode chambers. Similarly, the cathode supply includes a cathode supply path for feeding the cathode operating medium into the cathode chambers of the fuel cell, and a cathode exhaust gas path for discharging a cathode exhaust gas out of the cathode chambers.

The fuel cell system includes a humidifier for humidifying an operating medium, in particular the cathode operating medium. The humidifier transfers a portion of the moisture of an exhaust gas, in particular the cathode exhaust gas, which originates from the fuel cell, to a dry operating medium, in particular the comparatively dry cathode operating medium, in order to increase the power density and service life of the fuel cell (polymer electrolyte membranes; see below) during operation at high temperatures. Since fuel cells are operated at temperatures of approximately 60° C. to 80° C. and below 120° C., and water is formed in a chemical reaction of hydrogen with oxygen, water is generally also present in liquid form.

Part of the liquid water is utilized in the humidifier for humidifying the comparatively dry operating medium. However, due to high flow velocities the power or utilization factor of the humidifier for liquid water is not high, so that a certain quantity of liquid water once again exits the humidifier downstream. Liquid water may result in damage to a turbine situated in the exhaust gas path downstream from the humidifier. If a turbine is used in the fuel cell system, it is necessary to separate the liquid water in the exhaust gas upstream from the turbine with the aid of a water separator in order to protect the turbine.

An expander, for example the turbine, situated downstream from the humidifier may be protected with the aid of a water separator situated upstream from the expander, the water separator preferably being fluid-mechanically coupled into the exhaust gas path downstream from the humidifier. The liquid water which is separated in the water separator may be collected in a water collector and discharged to the surroundings. This takes place, for example, with the aid of a water discharge button in the vehicle. In addition, a problem with the liquid water upstream from the expander may be at least partially addressed with the aid of a comparatively large humidifier or a design of the humidifier based on the humidifying power, which is not high. Furthermore, when there is a comparatively large amount of liquid water in the exhaust gas, a comparatively high heat of condensation results which must be discharged to the surroundings with the aid of a comparatively large radiator.

SUMMARY OF THE INVENTION

It is an object of the present invention to be able to make good use of an installation space in a vehicle which includes a fuel cell system. A comparatively large humidifier of the fuel cell system should hereby be reducible in size so that installation space may be saved. The aim is preferably to increase the power of the humidifier so that the humidifier itself may possibly be designed to be smaller. This is to be achievable and implementable using simple, cost-effective means. A further aim is to be able to install a comparatively small radiator in the vehicle.

The present invention provides a fuel cell system, a method for recirculating water in a fuel cell system, and/or a vehicle, in particular an electric vehicle.

In the fuel cell system according to the present invention, a water separator for separating liquid water from an exhaust gas of a fuel cell of the fuel cell system is fluid-mechanically coupled into an exhaust gas path of the fuel cell system, a water recirculator being fluid-mechanically coupled into the fuel cell system, and with the aid of which at least a portion of the water of the water separator is once again providable to the fuel cell.

The water recirculator is usable in particular when a turbine is used downstream from a humidifier in an exhaust gas path, in particular a cathode exhaust gas path. The water separator is preferably fluid-mechanically coupled into the exhaust gas path, in particular the cathode exhaust gas path, preferably downstream from a moisture exchanger of the humidifier in the humidifier, downstream from the moisture exchanger, or downstream from the humidifier, and preferably upstream from the turbine.

According to the present invention, a recirculation of water from the exhaust gas, in particular exhaust air, of the fuel cell system into the fuel cell of the fuel cell system is possible. In particular, a recirculation of the water that is separated in the water separator takes place upstream from the moisture exchanger of the humidifier. This means that the water is recirculatable upstream in front of the humidifier, upstream at the humidifier, or upstream into the humidifier. Utilizing the separated water in the humidifier increases the power of the humidifier, so that the humidifier may have a smaller design. As a result, the quantity of liquid water in the exhaust gas, in particular in the cathode exhaust gas, is reduced.

In exemplary embodiments, starting from the water separator or starting from a water collector which is fluid-mechanically connected downstream from the water separator, water is providable to an operating medium of the fuel cell system, to an exhaust gas of the fuel cell system, and/or to the humidifier of a fuel cell supply of the fuel cell system with the aid of the water recirculator. The water is hereby providable to the operating medium directly or indirectly, to the exhaust gas directly, or to the humidifier directly or indirectly.

In exemplary embodiments, the water separator is fluid-mechanically coupled into the cathode exhaust gas path of a cathode supply of the fuel cell system, water being providable to a cathode operating medium of the fuel cell system, to the cathode exhaust gas of the fuel cell system, and/or to an anode supply of the fuel cell system with the aid of the water recirculator. In addition, in exemplary embodiments, a recirculation of the water through the water recirculator is achievable via natural circulation, a temperature gradient, a capillary force, a suction effect, a Coandă effect, or an exhaust gas turbocharger.

A recirculation of the water via natural circulation or a temperature gradient may take place, for example, with the aid of a (PTC) heater, a heat exchanger downstream from a refrigerant compressor (an air conditioner, for example), a heat exchanger downstream from a turbocompressor (cathode supply path), etc. Capillary tubes, for example, are usable for a recirculation of the water with the aid of capillary forces. In addition, a pump (suction effect), for example a jet pump or some other pump, may be used for transporting the water. Furthermore, a suction effect of a Venturi nozzle is usable. If an exhaust gas turbocharger (turbine-pump unit) is used for transporting the water, it is preferably designed without a separate electric motor.

In exemplary embodiments, the humidifier includes an internal water recirculator, the water separator and the water recirculator being accommodated essentially within the humidifier. This means that the water separator may be an integral part of the humidifier. With the aid of the internal water recirculator in the humidifier, the water that is essentially within the humidifier is hereby removable from the water separator, the water upstream being transportable upstream within the humidifier at a subsequent time, and subsequently once again being providable to the humidifier, upstream at or in the humidifier. The water separator is provided downstream at/in the humidifier at/in the cathode exhaust gas path, the water being returnable (also) against a flow direction of the cathode exhaust gas with the aid of the internal water recirculator.

In exemplary embodiments, a recirculation unit of the water recirculator for transporting the water is, for example, a line, a pipe, a channel, a wick, etc., at/in the humidifier. In addition, in exemplary embodiments a feed means of the water recirculator for returning the water against the flow direction of the cathode exhaust gas is a pump, a jet pump, a capillary, a Venturi nozzle, a (PTC) heater, a heat exchanger, a wick, etc., at/in the humidifier or at/in the water separator. Furthermore, in exemplary embodiments a feed means of the water recirculator for introducing or returning the water into the cathode exhaust gas is a pump, a jet pump, a capillary, a Venturi nozzle, a wick, etc., at/in the humidifier.

In exemplary embodiments, the cathode supply includes a water recirculator which is at least partially external with respect to the humidifier, the water separator being provided outside or inside the humidifier, downstream in the cathode exhaust gas path, and a feed means for the external water recirculator for introducing the water into the cathode exhaust gas path being provided upstream in the cathode exhaust gas path, outside or inside the humidifier. An above-mentioned recirculation unit, an above-mentioned recirculation means, and/or an above-mentioned feed means is/are usable externally with respect to the humidifier, or optionally internally in the humidifier. This means that an exemplary embodiment which includes an internal water recirculator may have features of an external water recirculator, and vice versa. The water is once again returnable, (also) against a flow direction of the exhaust gas, with the aid of the external water recirculator.

According to the present invention, an increase in the power or the utilization factor of the humidifier, and thus, a reduction in the overall size of the humidifier results, which provides installation space in the vehicle. In addition, the quantity of liquid water in the cathode exhaust gas is reduced. Furthermore, it is possible to reduce the heat of condensation of the fuel cell system, which reduces the requirements imposed on a radiator of the vehicle.

In the method according to the present invention for recirculating water, liquid water of a fuel cell supply of a fuel cell system is actively or passively withdrawn at a removal site at/in the fuel cell supply, the water upstream from the removal site being actively or passively provided to the same fuel cell supply and/or to some other fuel cell supply of the fuel cell system.

The fuel cell supply may be designed as a cathode supply or an anode supply of the fuel cell system, i.e., as the cathode supply or the anode supply of a fuel cell of the fuel cell system. This means that the water is once again provided to the cathode supply, and/or the water is provided to the anode supply. In addition, the fuel cell system may be designed as a fuel cell system according to the present invention.

In exemplary embodiments, the liquid water is withdrawn from an exhaust gas of the fuel cell system, from a water separator of the fuel cell system, or from a water collector of the fuel cell system. Of course, it is possible for the liquid water to be withdrawn from a plurality of these entities. In addition, in exemplary embodiments the removal site for the water is preferably the water separator or the water collector.

In exemplary embodiments, the water is provided to an operating medium of the fuel cell system, to an exhaust gas of the fuel cell system, and/or to a humidifier of the fuel cell supply. Of course, it is possible for the water to be provided to a plurality of these entities. If the water is provided to the humidifier, the water may be provided to the exhaust gas into a corresponding path upstream in front of the humidifier, or may be provided to the operating medium, directly upstream at the humidifier or upstream in the humidifier.

In exemplary embodiments, the liquid water originates from a water separator in a cathode exhaust gas path of a cathode supply of the fuel cell system, the water being provided to a humidifier of the cathode supply, and the water preferably being provided to a cathode exhaust gas, upstream from the humidifier, at the humidifier, or in the humidifier. Of course, it is possible for the liquid water to be withdrawn not from the water separator itself, but instead, to be withdrawn downstream from the water separator, for example from a water collector connected downstream from the water separator with respect to a flow direction of the liquid water.

The water is preferably provided once again to the exhaust gas upstream from the humidifier or to the exhaust gas upstream at/in the humidifier. The actively or passively returned water is delivered through the humidifier to a comparatively dry operating medium of the fuel cell system, which flows through the humidifier on the other side of a membrane of the humidifier. Of course, it is also possible to supply the water to the comparatively dry operating medium without a path via a membrane of the humidifier.

The present invention is explained in greater detail below based on exemplary embodiments, with reference to the appended schematic drawing. Elements, parts, or components which have an identical, univocal, or similar design and/or function are provided with the same reference numerals in the description of the figures, the list of reference numerals, and the patent claims, and/or are denoted with the same reference numerals in the figures of the drawing. Possible alternatives, static and/or kinematic inversions, combinations, etc., with regard to the explained exemplary embodiments of the present invention or individual assemblies, parts, or sections which are not explained in the description, illustrated in the drawings, and/or which are not exhaustive, may be obtained from the list of reference numerals.

All explained features, including those in the list of reference numerals, are usable not only in the stated combination or combinations, but also in some other combination or combinations, or alone. In particular it is possible, with reference to the reference numerals and the features associated with them in the description of the present invention, the description of the figures, and/or the list of reference numerals, to replace a feature or a plurality of features in the description of the present invention and/or the description of the figures.

DETAILED DESCRIPTION

Figure 1:
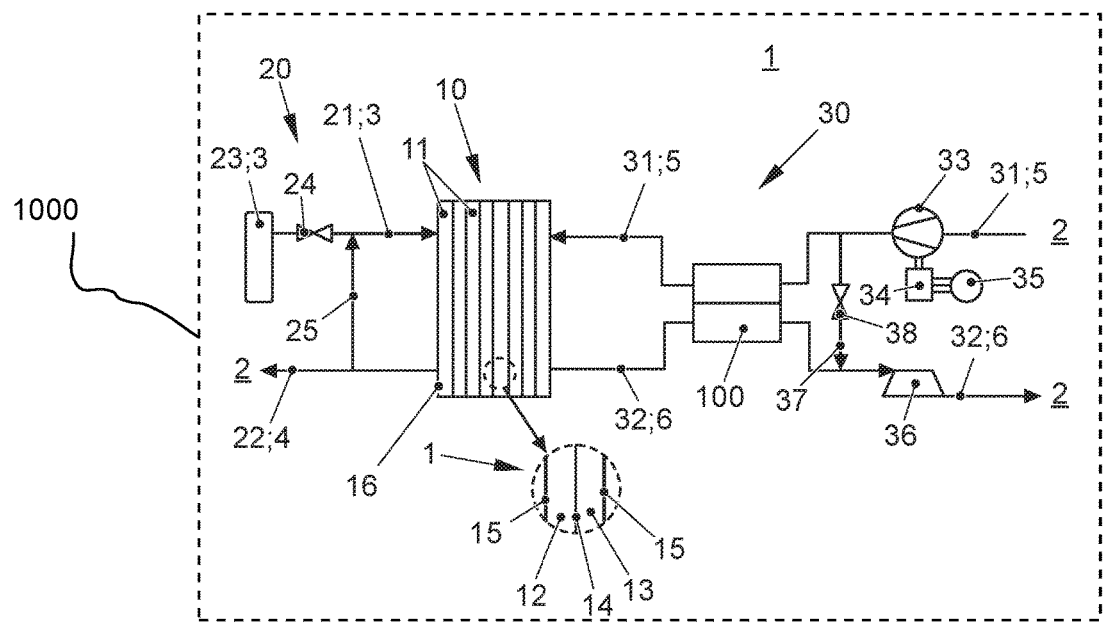
FIG. 1 shows a simplified block diagram of one preferred specific embodiment of a fuel cell system according to the present invention.

The present invention is explained in greater detail with reference to four specific embodiments of a water recirculator 120 for a cathode supply 30 of a fuel cell 10 of a fuel cell system 1 for a vehicle (passenger vehicle, passenger-carrying vehicle, bus, all-terrain vehicle (ATV), motorcycle, commercial vehicle (heavy-duty truck), construction vehicle, construction machine, special-purpose vehicle, rail vehicle), and is (implicitly) explained with reference to a method for recirculating water in a fuel cell system 1. However, the present invention is not limited to the exemplary embodiments explained below, but instead has a more fundamental nature, so that it may be used, for example, on a water recirculator of an anode supply of a fuel cell, a different fuel cell system, for example a transport system or some other means of transportation such as an aircraft, or also on portable or stationary fuel cell systems for generating electrical energy.

Only those parts of fuel cell system 1 that are necessary for an understanding of the present invention are illustrated in the drawing. In particular, a representation of the periphery of fuel cell system 1, of sensors, of electronic, electrical, and power electrical devices and/or units, etc., have largely been dispensed with. Although the present invention is described in greater detail and illustrated via preferred exemplary embodiments, the present invention is not limited by the provided exemplary embodiments. Other variations may be derived therefrom without departing from the protective scope of the present invention.

FIG. 1 shows a fuel cell system 1 according to one preferred specific embodiment of the present invention. The fuel cell system is preferably part of a vehicle, shown schematically as 1000, in particular a motor vehicle or an electric vehicle which preferably includes an electric traction motor, and which is suppliable with electrical energy by a fuel cell 10 of fuel cell system 1. Fuel cell system 1 may include further components which are not illustrated, in particular an engine control unit (ECU), or electronic, electrical, and power electrical devices and/or units (converter, battery, inverter, among others).

Fuel cell system 1 includes as a core component fuel cell 10, i.e., a fuel cell stack 10, which preferably includes a plurality of stacked single fuel cells 11, referred to below as single cells 11, and is accommodated in a preferably fluid-tight stack housing 16. Each single cell 11 includes an anode chamber 12 and a cathode chamber 13, anode chamber 12 with cathode chamber 13 being spatially and electrically separated from one another by a membrane (part of a membrane electrode assembly 14; see below), preferably an ion-conductive polymer electrolyte membrane (see detail). Fuel cell stack 10 is also referred to simply as a fuel cell 10.

Adjacent to the membranes, anode chambers 12 and cathode chambers 13 of fuel cell 10 each include a catalytic electrode (part of membrane electrode assembly 14 in question; see below), i.e., an anode electrode and a cathode electrode, which in each case catalyze a partial reaction of a fuel cell reaction. The anode electrode and the cathode electrode each include a catalytic material, for example platinum, which is preferably present in supported form on an electrically conductive carrier material having a large specific surface, for example a carbon-based material.

A structure made up of a membrane and the associated electrodes is also referred to as a membrane electrode assembly 14. Also indicated in FIG. 1, between two such membrane electrode assemblies 14 (only one membrane electrode assembly 14 is indicated in FIG. 1) is a bipolar plate 15 which is used for feeding operating media 3, 5 into a particular anode chamber 12 of a first single cell 11 and into a particular cathode chamber 13 of a second single cell 11 directly adjacent thereto, and which also establishes an electrically conductive connection between the two directly adjoining single cells 11.

An anode chamber 12 is provided between a bipolar plate 15 and an anode electrode, directly adjacent thereto, of a membrane electrode assembly 14, and a cathode chamber 13 is provided between a cathode electrode of the same membrane electrode assembly 14 and a second bipolar plate 15 directly adjacent thereto. Gas diffusion layers may optionally be situated between membrane electrode assemblies 14 and bipolar plates 15. Thus, membrane electrode assemblies 14 and bipolar plates 15 are arranged or stacked in alternation (fuel cell stack 10) in fuel cell stack 10 or in fuel cell 10.

For supplying fuel cell stack 10 or fuel cell 10 with operating media 3, 5, fuel cell system 1 includes an anode supply 20 on the one hand and a cathode supply 30 on the other hand.

Anode supply 20 includes an anode supply path 21 which is used for feeding an anode operating medium 3 a fuel 3, for example hydrogen 3 or a hydrogen-containing gas mixture 3, into anode chambers 12 of fuel cell 10. For this purpose, anode supply path 21 connects a fuel store 23 or fuel tank 23 to an anode input of fuel cell 10. Anode supply 20 also includes an anode exhaust gas path 22 which discharges an anode exhaust gas 4 from anode chambers 12 via an anode output of fuel cell 10. A built-up anode operating pressure on the anode side of fuel cell 10 is preferably settable with the aid of an actuating means 24 in anode supply path 21.

In addition, anode supply 20 preferably includes a fuel recirculation line 25 which fluid-mechanically connects anode exhaust gas path 22 to anode supply path 21. A recirculation of anode operating medium 3, i.e., fuel 3 that is in fact preferably to be supplied, is often implemented in order to recirculate anode operating medium 3, which is usually used in stoichiometric excess, to fuel cell 10 and to utilize same. In addition, a compressor (not illustrated) may be provided at/in fuel recirculation line 25.

Cathode supply 30 includes a cathode supply path 31 which supplies cathode chambers 13 of fuel cell 10 with an oxygen-containing cathode operating medium 5 (oxygen or an oxygen-containing gas mixture), preferably air 5, which in particular may be aspirated from the surroundings 2. Cathode supply 30 also includes a cathode exhaust gas path 32 which discharges a cathode exhaust gas 6, in particular exhaust air 6, from cathode chambers 13 of fuel cell 10 and supplies same to an exhaust gas device (not illustrated) which may be present.

For conveying and compressing cathode operating medium 5, a cathode compressor 33 is preferably situated at/in cathode supply path 31, i.e., fluid-mechanically coupled into cathode supply path 31. In exemplary embodiments, cathode compressor 33 is designed as an independently driven or also electromotively driven cathode compressor 33 which is driven with the aid of an electric motor 34 or a drive 34 which is preferably equipped with an appropriate power electronics system 35. Drive 34 may include a gear. In addition, a second cathode compressor (not illustrated) may be situated at/in cathode supply path 31.

Cathode compressor 33 is preferably designed as an at least electrically driven turbocharger (electric turbocharger (ETC)). For assistance, cathode compressor 33 may be additionally drivable by a cathode turbine 36 (not illustrated in the drawing) via a shared shaft or a gear, for example with the aid of a cathode turbine 36 which is situated in cathode exhaust gas path 32 and which optionally has a variable turbine geometry. Cathode turbine 36 represents an expander, which effectuates an expansion of cathode exhaust gas 6, and thus a lowering of its fluid pressure, resulting in increased efficiency of fuel cell 10. Of course, it is possible for cathode compressor 33 to be driven solely electromotively.

According to the illustrated specific embodiment, cathode supply 30 may include a wastegate 37 or a wastegate line 37 which connects cathode supply path 31 or a cathode supply line to cathode exhaust gas path 32 or to a cathode exhaust gas line, i.e., represents a bypass for fuel cell 10 on the cathode side. Wastegate 37 allows a mass flow or volume flow of cathode operating medium 5 to be temporarily reduced in fuel cell 10 without shutting down cathode compressor 33. An actuating means 38 situated in wastegate 37 allows an adjustment of a mass flow or volume flow of cathode operating medium 5 which optionally bypasses fuel cell 10.

All actuating means 24, 26, 38 of fuel cell system 1 may be designed as regulatable, controllable, or nonregulatable valves, flaps, throttles, diaphragms, etc. For further insulation of fuel cell 10 from surroundings 2, at least one additional appropriate actuating means (not illustrated) may be situated at/in an anode path 21, 22 and/or at/in a cathode path 31, 32, or at/in a line of anode path 21, 22 and/or at/in a line of cathode path 31, 32.

Preferred fuel cell system 1 also includes a humidifier 100. Humidifier 100 is on the one hand situated in cathode supply path 31 in such a way that cathode operating medium 5 may flow through it. On the other hand, humidifier 100 is situated in cathode exhaust gas path 32 in such a way that cathode exhaust gas 6 may flow through it. Humidifier 100 is situated on the one hand in cathode supply path 31, preferably between cathode compressor 33 and a cathode input of fuel cell 10, and on the other hand in cathode exhaust gas path 32 between a cathode output of fuel cell 10 and optionally provided cathode turbine 36. A moisture exchanger (not illustrated) of humidifier 100 preferably includes a plurality of membranes, which often have a design that is either flat or in the form of hollow fibers.

Driven by a fairly high partial pressure of water vapor in comparatively moist cathode exhaust gas 4, water passes through the moisture exchanger of humidifier 100 into comparatively dry cathode operating medium 3, which is moistened in this way. This means that comparatively dry cathode operating medium 3 is initially present beforehand, and a comparatively moist cathode operating medium 3 is present afterwards. A similar or inverse situation is present for cathode exhaust gas 4. Comparatively moist cathode exhaust gas 4 is initially present beforehand, and a comparatively dry cathode exhaust gas 4 is present afterwards. Comparatively dry cathode operating medium 3, in particular comparatively dry air 3 from surroundings 2, hereby flows from compressor 33, whereas comparatively dry cathode exhaust gas 4, in particular comparatively dry exhaust air 4, flows toward turbine 36.

Various further particulars of fuel cell system 1 or fuel cell 10, of fuel cell stack 10, of anode supply 20, and/or of cathode supply 30 are not illustrated in simplified FIG. 1 for the sake of clarity. Thus, humidifier 100 may be bypassed on the part of cathode supply path 31 and/or on the part of cathode exhaust gas path 32 with the aid of a bypass line. A turbine bypass line on the part of cathode exhaust gas path 32 which bypasses cathode turbine 36 may also be provided.

In addition, a water separator 110 may be installed in anode exhaust gas path 22 and/or in cathode exhaust gas path 32 (see FIGS. 2 through 5), with the aid of which product water which results from the particular partial reaction of fuel cell 10 is condensable and/or separatable, and optionally dischargeable into a water collector (not illustrated). Furthermore, anode supply 20 may alternatively or additionally include a humidifier 100 which is similar to that for cathode supply 30. In addition, anode exhaust gas path 22 may open into cathode exhaust gas path 32 or vice versa, whereby anode exhaust gas 4 and cathode exhaust gas 6 may optionally be discharged via the shared exhaust gas device. Moreover, in exemplary embodiments, cathode operating medium 5 may flow through a charge air cooler (not illustrated) provided at/in cathode supply path 31.

As explained at the outset, downstream from moisture exchanger (cathode exhaust gas path 32) of humidifier 100 or downstream from humidifier 100, comparatively dry cathode exhaust gas 4 contains liquid water which is separatable by water separator 110, for example, in order to protect turbine 36. According to the present invention, at least a portion of this liquid water is reused and not discharged in a chronological order to surroundings 2, for example. According to the present invention, this takes place with the aid of a water recirculator 120 which provides water to humidifier 100. For this purpose, the liquid water is withdrawn from cathode exhaust gas 6, downstream from the moisture exchanger of humidifier 100 or downstream from humidifier 100, and resupplied (introduced) to cathode exhaust gas 6 upstream from the moisture exchanger of humidifier 100 or upstream from humidifier 100. The water may be in gaseous form.

Water recirculator 120 (see FIGS. 2 through 5) withdraws the liquid water, for example, from water separator 110, from a water collector connected downstream from a fluid flow of the liquid water, or from some other device (not illustrated) or unit (not illustrated), downstream from the moisture exchanger of humidifier 100. Water separator 110 may be fluid-mechanically coupled into cathode exhaust gas path 32 downstream from the moisture exchanger of humidifier 100 inside humidifier 100 (water separator 110 internal to the humidifier (see FIGS. 2 through 4)), i.e., inside a housing of humidifier 100, or downstream from humidifier 100 (water separator 110 external to the humidifier (see FIG. 5)), i.e., outside the housing of humidifier 100.

Water recirculator 120 transports the water back, also against a flow direction of cathode exhaust gas 6, on/in a suitable path, for example inside humidifier 100, at the moisture exchanger of humidifier 100, outside the moisture exchanger of humidifier 100, at humidifier 100, or outside humidifier 100. Of course, this takes place outside cathode exhaust gas 6 or is insulated with respect to cathode exhaust gas 6. For this purpose, water recirculator 120 may optionally include (see below) a suitable recirculation unit 122 or a suitable recirculation device 122 for transporting the water back, such as a line 122, a pipe 122, a channel 122, a wick 122, a capillary 122, a chamber 122, etc.

In addition, water recirculator 120 conveys the water back through recirculation device 122, for example. A recirculation means 124 may be used for returning the water, in addition to recirculation device 122 or as an alternative to recirculation device 122. For example, a pump 124, a jet pump 124, a capillary 124, a Venturi nozzle 124, a (PTC) heater 124 (natural circulation; see below), a heat exchanger 124 (natural circulation; see below), a wick 124, etc., is suitable as a recirculation means 124 for returning the water.

Furthermore, water recirculator 120 may include a feed means 126 in addition to recirculation unit 122 and/or in addition to recirculation means 124 or as an alternative to recirculation unit 122 and/or as an alternative to recirculation means 124. Feed means 126 of water recirculator 120 may be fluid-mechanically coupled into cathode exhaust gas path 32 upstream from the moisture exchanger of humidifier 100, inside humidifier 100 (feed means 126 internal to the humidifier; see FIGS. 2 through 4), i.e., inside the housing of humidifier 100, or upstream from humidifier 100 (feed means 126 external to the humidifier; see FIG. 5), i.e., outside the housing of humidifier 100. For example, a pump 126, a jet pump 126, a capillary 126, a Venturi nozzle 126, a wick 126, an opening 126, a connection 126, etc. is suitable as a feed means 126 for introducing the water and optionally for returning the water.

In this regard, water recirculator 120 itself may take over the function of recirculation device 122, of recirculation means 124, and/or of feed means 126. Similarly, recirculation unit 122 itself may take over the function of water recirculator 120, of recirculation means 124, and/or of feed means 126. Similarly, recirculation means 124 itself in turn may take over the function of water recirculator 120, of recirculation unit 122, and/or of feed means 126. In addition, feed means 126 may similarly take over the function of water recirculator 120, of recirculation unit 122, and/or of recirculation means 124. Furthermore, for an external water recirculator 120 it is possible, of course, to use at least one feature of an internal water recirculator 120, or for an internal water recirculator 120, to use at least one feature of an external water recirculator 120 (internal/external water recirculator 120; neither is illustrated).

Of course, it is possible to convey or transport the water to some other location in fuel cell system 1. Thus, for example, it is possible to introduce the water directly into cathode operating medium 5 without a bypass via the moisture exchanger of humidifier 100, which may take place, for example, in cathode supply path 31 downstream from the moisture exchanger of humidifier 100 in humidifier 100 (feed means 126, not illustrated, internal to the humidifier), or downstream from humidifier 100 (feed means 126, likewise not illustrated, external to the humidifier). In addition, it is possible to provide the water to anode supply 20, for example, to anode supply path 21, to fuel recirculation line 25, to anode exhaust gas path 22, preferably upstream from fuel recirculation line 25.

In exemplary embodiments of the present invention, it is possible to provide at least one of the following components in an internal or external water recirculator 120, i.e., for internal or external water recirculator 120 to include a recirculation unit 122 or a recirculation device 122 (see above), a recirculation means 124 (see above), and/or a feed means 126 (see above). It is thus possible, for example, to design water recirculator 120, apart from a fluid connection to and/or an opening at/in the cathode exhaust gas path 32, solely as a plurality of capillaries 122/124/126; it is also possible to form water recirculator 120 from a line 122 and a pump 124/126; etc. In exemplary embodiments, humidifier 100 and/or water separator 110 may be part of water recirculator 120.

In exemplary embodiments, water separator 110 may be an integral part of water recirculator 120 or may be added to water recirculator 120. Humidifier 100 may be designed in such a way that its moisture exchanger implements a same-direction flow, a counterflow, or a crossflow between cathode operating medium 5 and cathode exhaust gas 6. Humidifier 100 may be designed in such a way that cathode operating medium 5 is provided so that it may flow horizontally, vertically, or both horizontally and vertically through humidifier 100. Similarly, humidifier 100 may be designed in such a way that cathode exhaust gas 6 is provided so that it may flow horizontally, vertically, or both horizontally and vertically through humidifier 100.

FIGS. 2 through 5 show greatly simplified examples of specific embodiments of water recirculators 120 for water, during operation of fuel cell system 1, the liquid water being withdrawn from water separator 110 (removal site), which is provided downstream from the moisture exchanger of humidifier 100. The water collector or some other device or unit is also usable instead of water separator 110 (see above).

Figure 2:
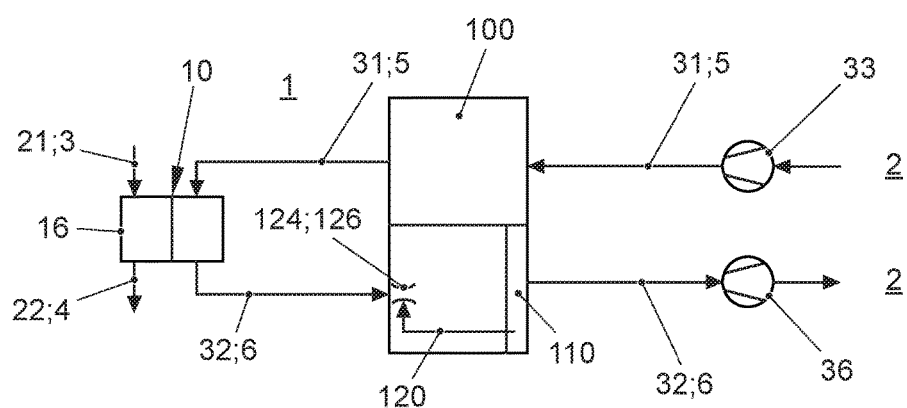
FIG. 2 shows a greatly simplified block diagram of a first specific embodiment of the fuel cell system according to the present invention, with an internal water recirculator in a humidifier.
Figure 3:
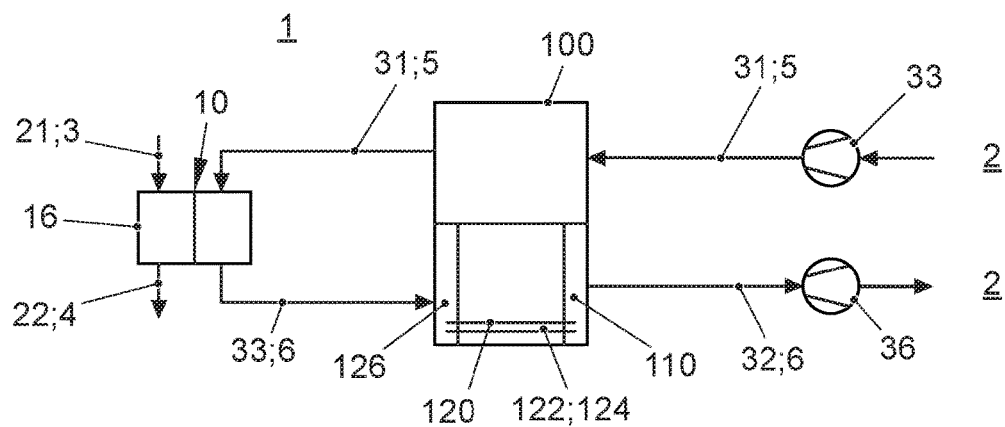
FIG. 3 shows a greatly simplified block diagram of a second specific embodiment of the fuel cell system according to the present invention, once again with an internal water recirculator in the humidifier.
Figure 4:
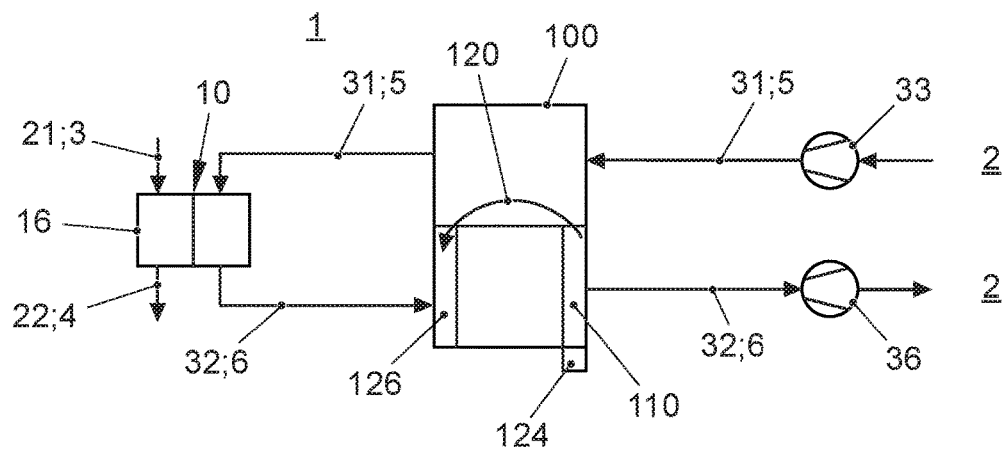
FIG. 4 shows a greatly simplified block diagram of a third specific embodiment of the fuel cell system according to the present invention, once again with an internal water recirculator in the humidifier.

FIG. 2 shows a water recirculator 120 which is integrated into humidifier 100, water separator 110 also being integrated into humidifier 100. A recirculation unit 122 (not illustrated in FIG. 2) or a recirculation device 122 (not illustrated in FIG. 2) for transporting the water may be a line 122, a pipe 122, a channel 122, a chamber 122, etc., in humidifier 100. In such a specific embodiment, a recirculation means 124 for returning the water and a feed means 126 for introducing the water are preferably designed together as a pump 124/126, in particular a jet pump 124/126, or a Venturi nozzle 124/126. Integration of water separator 110 and pump 124/126, in particular jet pump 124/126, or Venturi nozzle 124/126 into humidifier 100 results in a compact design.

FIG. 3 shows once again a water recirculator 120 which is integrated into humidifier 100, water separator 110 once again being integrated into humidifier 100. In such a specific embodiment, a recirculation unit 122 or a recirculation device 122 for transporting the water, a recirculation means 124 for returning the water, and/or a feed means 126 for introducing the water are preferably designed, for example, together as wicks 122/124/126 or capillary tubes 122/124/126. In addition, a recirculation unit 122 (not illustrated in FIG. 3) may be provided as a line 122, a pipe 122, a channel 122, a chamber 122 etc., in humidifier 100, in which wicks 122/124/126, for example, are provided. Furthermore, capillary tubes 122/124/126 may be provided in humidifier 100 itself or at/in its moisture exchanger.

FIG. 4 shows once again a water recirculator 120 which is integrated into humidifier 100, water separator 110 once again being integrated into humidifier 100. The recirculation of the water takes place via so-called natural circulation, which is heat-driven, for example (temperature gradient). This means that a recirculation means 124 for returning the water is designed, for example, as a (PTC) heater 124, a heat exchanger 124, etc., with the aid of which an area at/in water separator 110 and/or at/in humidifier 100 is heatable.

Heat exchanger 124 is designed, for example, as a heat exchanger 124 downstream from a refrigerant compressor, for example of an air conditioner of the vehicle. In addition, heat may be withdrawn at/in an exhaust gas turbocharger. A Coandă effect, a capillary force, etc., is also usable in addition to a temperature gradient as natural circulation. A recirculation device 122 (not illustrated in FIG. 4) or a recirculation device 122 (not illustrated in FIG. 4) for transporting the water is designed, for example, as a line 122, a pipe 122, a channel 122, a chamber 122, etc., in humidifier 100. A feed means 126 for introducing is designed, for example, as an opening 126, a connection 126, etc.

Figure 5:
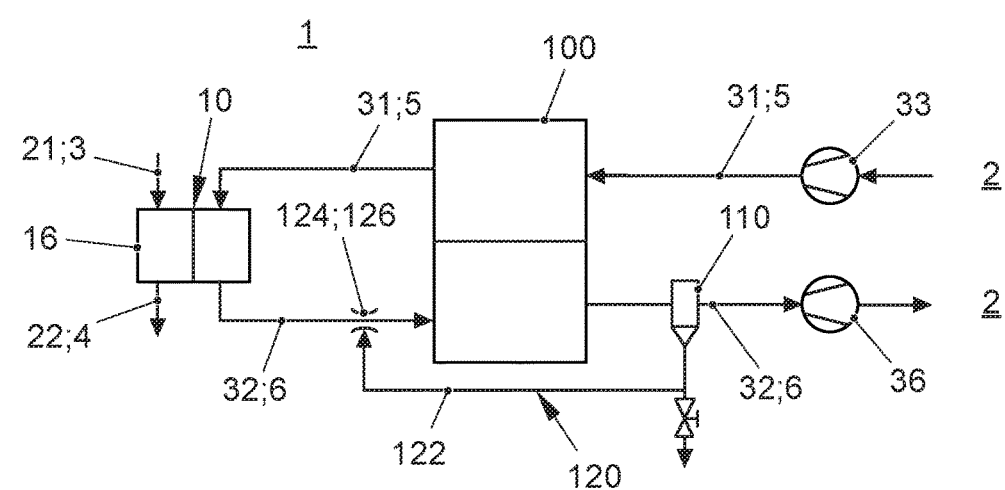
FIG. 5 shows a greatly simplified block diagram of a fourth specific embodiment of the fuel cell system according to the present invention, with an external water recirculation to the humidifier.

FIG. 5 shows a water recirculator 120 which is external with respect to humidifier 100, water separator 110 also being provided externally with respect to humidifier 100. A recirculation unit 122 or a recirculation device 122 for transporting the water may be a line 122, a pipe 122, a channel 122, a chamber 122, etc., at or outside humidifier 100. In such a specific embodiment, a recirculation means 124 for returning the water and a feed means 126 for introducing the water are preferably designed together as a pump 124/126, in particular a jet pump 124/126, or a Venturi nozzle 124/126.

LIST OF REFERENCE NUMERALS 1 fuel cell system, preferably for a vehicle which includes an electric motor, in particular an electric traction motor
2 surroundings
3 fluid, operating medium, reactant, in particular anode operating medium, actual fuel, preferably hydrogen or a hydrogen-containing gas mixture
4 fluid, exhaust gas optionally including liquid water, in particular anode exhaust gas
5 fluid, operating medium, reactant, in particular cathode operating medium, preferably air
6 fluid, exhaust gas, optionally including liquid water, in particular cathode exhaust gas, preferably exhaust air
10 fuel cell, fuel cell stack of fuel cell system 1
11 single cell which includes an anode electrode of the anode of fuel cell 10 and a cathode electrode of the cathode of fuel cell 10, single fuel cell
12 anode chamber of a single cell 11
13 cathode chamber of single cell 11
14 membrane electrode assembly, preferably including a polymer electrolyte membrane, and an anode electrode, a cathode electrode, and optionally a support for same
15 bipolar plate, flow field plate, separator plate
16 stack housing of fuel cell 10
20 fuel cell supply, anode supply, anode circuit of fuel cell 10 or of fuel cell stack 10
21 path, supply path, flow path, anode supply path
22 path, exhaust gas path, flow path, anode exhaust gas path
23 fuel store, fuel tank containing anode operating medium 3
24 actuating means, regulatable/adjustable, actuatable/controllable, nonregulatable, in particular a valve, flap, throttle, diaphragm, etc.
25 fuel recirculation line
26 actuating means, regulatable/adjustable, actuatable/controllable, nonregulatable, in particular a valve, flap, throttle, diaphragm, etc.
30 fuel cell supply, cathode supply, cathode circuit of fuel cell or of fuel cell stack 10
31 path, supply path, flow path, cathode supply path
32 path, exhaust gas path, flow path, cathode exhaust gas path
33 compressor, cathode compressor, optionally of an exhaust gas turbocharger
34 motor, in particular electric motor, or drive, optionally including a gear 35 electronics system, in particular power electronics system, for motor 34
36 turbine having an optionally variable turbine geometry, cathode turbine, expander, optionally of an exhaust gas turbocharger
37 wastegate, wastegate line
38 actuating means, regulatable/adjustable, actuatable/controllable, nonregulatable, in particular a valve, flap, throttle, diaphragm, etc.
100 humidifier, moisture exchanger, preferably including membrane(s) permeable to water vapor, for example a flat arrangement in the form of hollow fibers, hollow fiber bodies, etc.
110 water separator, optionally including a downstream water collector
120 (internal, external, internal/external) water recirculator
122 recirculation unit/device for transporting the water (optional), for example a line, pipe, channel, wick, capillary, chamber, etc.
124 recirculation means for returning the water (optional), for example a pump, jet pump, capillary, Venturi nozzle, (PTC) heater, heat exchanger, wick, etc.
126 feed means for introducing the water (optional), for example a pump, jet pump, capillary, Venturi nozzle, wick, opening, connection, etc.
1000 vehicle

What is claimed is:

1. A fuel cell system comprising:
a fuel cell;
a water separator for separating liquid water from a cathode exhaust gas of the fuel cell, the water separator being fluid-mechanically coupled into a cathode exhaust gas path of the fuel cell system; and
a water recirculator fluid-mechanically coupled into the fuel cell system, at least a portion of the water of the water separator being once again providable to a cathode operating medium of the fuel cell with aid of the water recirculator; and
a humidifier in the cathode exhaust gas path, the water recirculator being at least partially external with respect to the humidifier, the water separator being provided downstream of the humidifier in the cathode exhaust gas path, the water recirculator providing water to the humidifier and the cathode operating medium passing through the humidifier.

2. The fuel cell system as recited in claim 1 wherein a recirculation of the water through the water recirculator is achievable via natural circulation, a temperature gradient, a capillary force, a suction effect, a Coanda effect, or an exhaust gas turbocharger.

3. A vehicle comprising the fuel cell system as recited in claim 1.

4. The vehicle as recited in claim 3 wherein the vehicle is an electric vehicle.

5. The fuel cell system as recited in claim 1 wherein the water recirculator includes a heater or heat-exchanger.

6. The fuel cell system as recited in claim 1 further comprising an anode exhaust gas path not providing water to a cathode operating medium of the fuel cell.

7. A fuel cell system comprising:
a fuel cell;
a water separator for separating liquid water from an exhaust gas of the fuel cell, the water separator being fluid-mechanically coupled into an exhaust gas path of the fuel cell system;
a water recirculator fluid-mechanically coupled into the fuel cell system, at least a portion of the water of the water separator being once again providable to the fuel cell with aid of the water recirculator; and
a humidifier in the cathode exhaust gas path and a water recirculator at least partially external with respect to the humidifier, the water separator being provided downstream of the humidifier in the cathode exhaust gas path, and a feed for the external water recirculator for introducing the water into a cathode exhaust gas path and being provided upstream of the humidifier in the cathode exhaust gas path.

8. The fuel cell system as recited in claim 7 wherein, starting from the water separator or from a water collector fluid-mechanically connected downstream from the water separator, water is providable to an operating medium of the fuel cell system, to the exhaust gas, or to a humidifier of a fuel cell supply of the fuel cell system with aid of the water recirculator.

9. The fuel cell system as recited in claim 7 wherein the water separator is fluid-mechanically coupled into a cathode exhaust gas path of a cathode supply of the fuel cell system, and water is providable to the cathode operating medium of the fuel cell system, to a cathode exhaust gas of the fuel cell system, or to an anode supply of the fuel cell system with aid of the water recirculator.

10. The fuel cell system as recited in claim 7 wherein a recirculation of the water through the water recirculator is achievable via natural circulation, a temperature gradient, a capillary force, a suction effect, a Coanda effect, or an exhaust gas turbocharger.

11. A vehicle comprising the fuel cell system as recited in claim 7.

12. The vehicle as recited in claim 11 wherein the vehicle is an electric vehicle.

13. The fuel cell system as recited in claim 7 wherein a recirculation of the water through the water recirculator is achievable via a capillary force, a suction effect, or a Coanda effect.

14. The fuel cell system as recited in claim 1 wherein a recirculation of the water through the water recirculator is achievable via a capillary force, a suction effect, or a Coanda effect.

15. The fuel cell system as recited in claim 1 wherein the water recirculator includes a Venturi nozzle.

16. The fuel cell system as recited in claim 1 wherein the water recirculator includes a jet pump.

17. The fuel cell system as recited in claim 1 wherein the water recirculator includes wicks.

18. The fuel cell system as recited in claim 1 wherein the water recirculator includes capillary tubes.

19. A fuel cell system comprising:
a fuel cell;
a water separator for separating liquid water from a cathode exhaust gas of the fuel cell, the water separator being fluid-mechanically coupled into a cathode exhaust gas path of the fuel cell system; and
a water recirculator fluid-mechanically coupled into the fuel cell system, at least a portion of the water of the water separator being once again providable to a cathode operating medium of the fuel cell with aid of the water recirculator, the water recirculator including capillary tubes.

* * * * *